(12) United States Patent
Itzkowitz

(10) Patent No.: US 11,257,317 B2
(45) Date of Patent: *Feb. 22, 2022

(54) USER ENGAGEMENT AND MANNERISM TRACKING SYSTEM AND METHOD FOR GAMING SYSTEMS

(71) Applicant: JINGLZ, INC, Boynton Beach, FL (US)

(72) Inventor: Aaron Itzkowitz, Boynton Beach, FL (US)

(73) Assignee: JINGLZ INC., Boynton Beach, FL (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/827,649

(22) Filed: Mar. 23, 2020

(65) Prior Publication Data

US 2020/0226871 A1 Jul. 16, 2020

Related U.S. Application Data

(63) Continuation-in-part of application No. 16/014,274, filed on Jun. 21, 2018, now Pat. No. 10,609,450.

(60) Provisional application No. 62/795,448, filed on Jan. 22, 2019, provisional application No. 62/545,722, filed on Aug. 15, 2017.

(51) Int. Cl.
| | |
|---|---|
| *H04H 60/33* | (2008.01) |
| *H04H 60/56* | (2008.01) |
| *G07F 17/32* | (2006.01) |
| *G06F 3/01* | (2006.01) |
| *G06K 9/00* | (2022.01) |

(52) U.S. Cl.
CPC .......... *G07F 17/3206* (2013.01); *G06F 3/013* (2013.01); *G06K 9/00315* (2013.01); *G07F 17/3209* (2013.01); *G07F 17/3211* (2013.01); *G07F 17/3237* (2013.01)

(58) Field of Classification Search
CPC ......... H04N 21/44218; H04N 21/4223; H04N 21/4667; G06F 3/013; G06K 9/00308
See application file for complete search history.

(56) References Cited

U.S. PATENT DOCUMENTS

| | | | | |
|---|---|---|---|---|
| 10,880,602 | B2 * | 12/2020 | Itzkowitz | H04N 21/4667 |
| 2012/0222058 | A1 * | 8/2012 | el Kaliouby | H04N 21/251 |
| | | | | 725/10 |
| 2015/0208125 | A1 * | 7/2015 | Robinson | H04N 21/4436 |
| | | | | 725/12 |
| 2017/0243055 | A1 * | 8/2017 | Naveh | G06F 16/5866 |
| 2018/0020963 | A1 * | 1/2018 | Friant | A61B 5/6801 |
| | | | | 705/14.66 |

* cited by examiner

*Primary Examiner* — Kyu Chae
(74) *Attorney, Agent, or Firm* — Mark C. Johnson; Johnson Dalal

(57) ABSTRACT

A software- or computer-implemented system and method utilized to track user engagement and mannerisms for gaming methods and systems. The present system and method is used in conjunction with open source software to track the plurality of facial expressions generated by a user in response to the publication and viewing of a plurality of media presentations. The plurality of facial expressions of the user are analyzed to determine approval or disapproval and, in turn, to ascertain the type of media presentations that are again published thereafter by the gaming machine, solely based on the plurality of facial expressions of the user.

12 Claims, 7 Drawing Sheets

USER ENGAGEMENT AND MANNERISM TRACKING SYSTEM AND METHOD FOR GAMING SYSTEMS

FIELD OF THE INVENTION

The present invention relates generally to facial recognition and tracking software and systems, and, more particularly, relates to software-implemented systems and methods utilized to track user engagement and mannerisms for gaming methods and systems.

BACKGROUND OF THE INVENTION

Games available in most casinos are commonly called casino games. In a casino game, the players gamble casino chips on various possible random outcomes or combinations of outcomes. A slot machine is a casino gambling machine with three or more reels which spin when a button is pushed. Slot machines were originally operated by one lever on the side of the machine, as distinct from a button on the front panel, and many modern machines are still equipped with a legacy lever in addition to the buttons. Slot machines include a currency detector that validates the money inserted to play, and the machine pays off according to patterns of symbols visible on the front of the machine when it stops. Slot machines are the most popular gambling method in casinos and constitute about 70 percent of the average U.S. casino's income. Modernly, slot machines may be equipped with user-interactive video interfaces.

Conventional video interfaces are limited either by requiring physical user input, such as a person's hand, which may be used to interact with an input device such as a mouse, keyboard, trackpad, or touchscreen, or speech recognition, which may either understand the words the person is saying or which may determine a person's emotional affect or mental state in order to determine approval or disapproval for the displayed content. In the case of the former, a user must have a hand free to interact with the input method, or, in the latter, must be able to speak clearly in order to interact with a media presentation. With emotional affect or mental state voice recognition, there may not be any background noises that may register a false positive reading. This is often impossible in public settings such as in casinos, on public transportation, at public events, at fitness centers, or even while a third-party is talking to the user. Also, for speech recognition, an artificial intelligence system must be able to understand the speaker, which may be difficult to record if a media presentation is playing simultaneously on the same device.

Therefore, there is a need in the art for a casino game engagement and mannerism tracking system for analyzing a user's facial expressions to determine the user's affect or mind state. Such a system may provide an alternate input means allowing users to interact with the casino game, and may also be used as a feedback method for altering the behavior of the casino game in response to the user's affect or mind state.

SUMMARY OF THE INVENTION

The invention provides a computer-implemented user engagement and mannerism tracking system and method for gaming systems that overcomes the hereinafore-mentioned disadvantages of the heretofore-known devices and methods of this general type.

With the foregoing and other objects in view, there is provided, in accordance with the invention, a computer-implemented method of user engagement and tracking user mannerisms for gaming systems comprising a first Step of providing a gaming machine with a display screen, eye-tracking software, facial recognition software, a camera configured to face in the same direction as the display screen faces, and a media player, the facial recognition software operably configured to recognize a plurality of facial expressions of a user using a plurality of facial recognition parameters on the user's face.

A second Step provides a central database communicatively coupled with the gaming machine and storing a plurality of media presentations.

In accordance with another Step, an embodiment of the present invention includes a next Step of publishing one of the plurality of media presentations through the media player on the display screen of the gaming machine.

In accordance with a further Step of the present invention, there is provided a Step of confirming sight by the user of the one of the plurality of media presentations using eye-tracking software and using the camera. While confirming sight by the user, a further Step entails capturing, through the facial recognition software, at least one of the plurality of facial expressions of the user.

A final Step comprises publishing another of the plurality of media presentations through the media player on the display screen and, after initial publication of the one of the plurality of media presentations, solely based on the at least one of the plurality of facial expressions of the user.

In accordance with another feature, an embodiment of the present invention also includes prompting the user through the display screen to elicit an intentional facial response of the user of either a smile and a frown on the user's face and, once sight by the user is confirmed, the smile and the frown on the user's face associated with a user approval and a user disapproval, respectively, of the one of the plurality of media presentations.

In accordance with yet another feature, an embodiment of the present invention includes capturing, through the facial recognition software, the intentional facial response and communicating the intentional facial response to the central database for association with one of a plurality of user records resident thereon and to generate the user baseline.

In accordance with a further feature, the present invention may further comprise a Step of publishing another of the plurality of media presentations through the media player on the display screen and, after initial publication of the one of the plurality of media presentations and during publication of the another of the plurality of media presentations through the media player on the display screen, prompting the user through the display screen to elicit another intentional facial response of the user of either the smile and the frown on the user's face.

An additional Step comprises capturing, through the facial recognition software, the another intentional facial response of the user and communicating the another intentional facial response to the central database for ascertaining the user approval or the user disapproval using the user baseline.

In accordance with another feature, the present invention may entail removing or maintaining the publication of the another of the plurality media presentations with the user approval or the user disapproval, respectively, of the another intentional facial response of the user.

The facial recognition software may be operably configured to recognize the plurality of facial expressions using the plurality of facial recognition parameters on the user's face and with a user baseline. If the sight by the user is not confirmed after one of the plurality of media presentations is published, another Step may comprise not prompting the user through the display screen to elicit an intentional facial response of the user of either the smile and the frown on the user's face.

In certain embodiments, a further Step may entail, after confirming sight by the user of the one of the plurality of media presentations using eye-tracking software, measuring ambient lighting around the camera of the gaming machine and, if unable to capture the intentional facial response through the facial recognition software because of insufficient ambient lighting around the camera of the gaming machine, increasing the brightness of the display screen on the mobile electronic device.

A further feature may comprise periodically confirming sight by the user using the eye-tracking software to recognize a smile and a frown on a user's face with a user baseline.

In accordance with yet another feature, the present invention may include a Step of, after capturing the at least one of the plurality of facial expressions of the user, identifying the at least one of the plurality of facial expressions as comprising pupil dilation or horizontal movement and demarcating the intoxicated or non-intoxicated status of the user in the central database. A further feature may entail reporting the status of the intoxicated or non-intoxicated user to a predetermined, designated controller of the machine.

Although the invention is illustrated and described herein as embodied in a computer-implemented method of user engagement and tracking user mannerisms for gaming systems, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

To minimize the limitations in the prior art, and to minimize other limitations that will be apparent upon reading and understanding the present specification, the present invention describes a computer-implemented method and system for analyzing a user's facial responses to determine an appropriate progression of outputs.

It is known to have a system for reading facial expressions that may categorize such expressions into seven different primary categories, such categories including happiness, sadness, contempt, disgust, surprise, fear, and anger. Such expressions may be identified by measuring changes in movement of certain facial features, namely the corners of the mouth, the corners of the eyes, the vertical position of the eyebrows, the prominence of the cheeks, and the furrows of the forehead.

It is known to have a facial recognition software which may be used on a smartphone, tablet, or computer, and which may read a plurality of facial landmarks on a user's face. Such a software may use such facial landmarks to read the position of and changes in position of various facial muscles associated with facial expressions. Such a software may read facial expressions in still photos or may read facial expressions in real time. Such readings may be displayed on a chart of measured landmarks over time to determine a correlation with the movements of particular facial muscles and their association with specific facial expressions.

It is known to have a facial recognition software which may be used to determine a progression of video sequences based on a user's facial expressions. Such a software may include information on one or more of a group consisting of facial expressions, action units, head gestures, smiles, brow furrows, squints, lowered eyebrows, raised eyebrows, smirks, and attention. The physiological data may include one or more of electrodermal activity, heart rate, heart rate variability, skin temperature, and respiration. The method may further comprise inferring of mental states based on the mental state data which was collected. The mental states may include one of a group consisting of frustration, confusion, disappointment, hesitation, cognitive overload, focusing, being engaged, attending, boredom, exploration, confidence, trust, delight, valence, skepticism, and satisfaction. The playing of the first media presentation may be done on a mobile device or slot machine interface and further comprising recording of facial images with the mobile device or slot machine interface as part of the capturing of the mental state data.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the figures. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
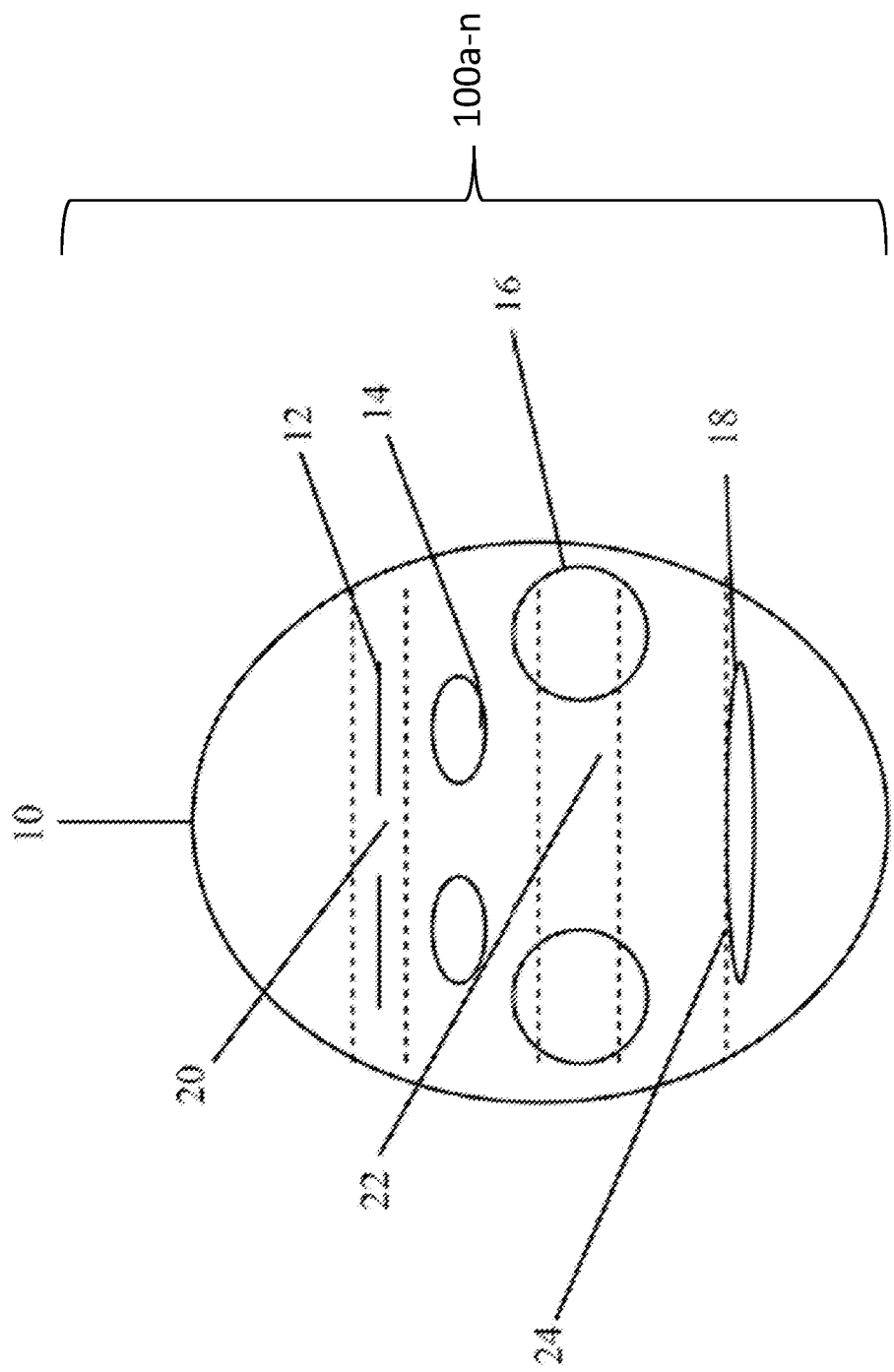
FIG. 1 is a schematic illustration of a user's face, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient method of publishing a plurality of media presentations to a casino game user, identifying at least one of a plurality of facial expressions of a casino game user in response to the plurality of media presentations, and publishing a plurality of media presentations through a media player on a display screen after initial publication of the one of the plurality of media presentations, solely based on the at least one of the plurality of facial expressions of the user. The figures show several advantageous features of the present invention, but, as will be described below, the invention can be provided in several shapes, sizes, combinations of features and components, and varying numbers and functions of the components.

Referring now to FIG. 1, one embodiment of the present invention is shown in connection with a schematic illustration of a user's 58 face. FIG. 1 illustrates the rough geometric shape of a user's 58 face 10 with detail given to the eyebrows 12, eyes 14, cheeks 16, and mouth 18. The casino game user's (hereinafter "user") 58 face can initially be detected using available open source facial recognition and detection systems. Such a system may comprise a camera device and camera software and may be any system in common usage on the market.

The user's 58 face associated with the physical markers above has been arbitrarily divided into the following three sections: a top section 20 including the eyebrows 12, a middle section 22 including the cheeks 16, and a lower section 24 including the mouth 18. The variables in these quadrants can be written into a conditional mathematical formula to determine the aggregate resulting facial response: either a frown or smile.

By way of a first example, a frown may be determined by a decreased measure on the baseline in top section 20, which may be associated with downturned eyebrows, combined with a decrease in lower section 24, which may be associated with downturned corners of the mouth 18, with no change in middle section 22.

By way of a second example, a smile may be determined by an increased measure on the baseline in lower section 14, which may be associated with upturned corners of the mouth 18, combined with an increased measure on the baseline of middle section 12, which may be associated with elevated cheeks 16, with no change in top section 10.

Figure 2:
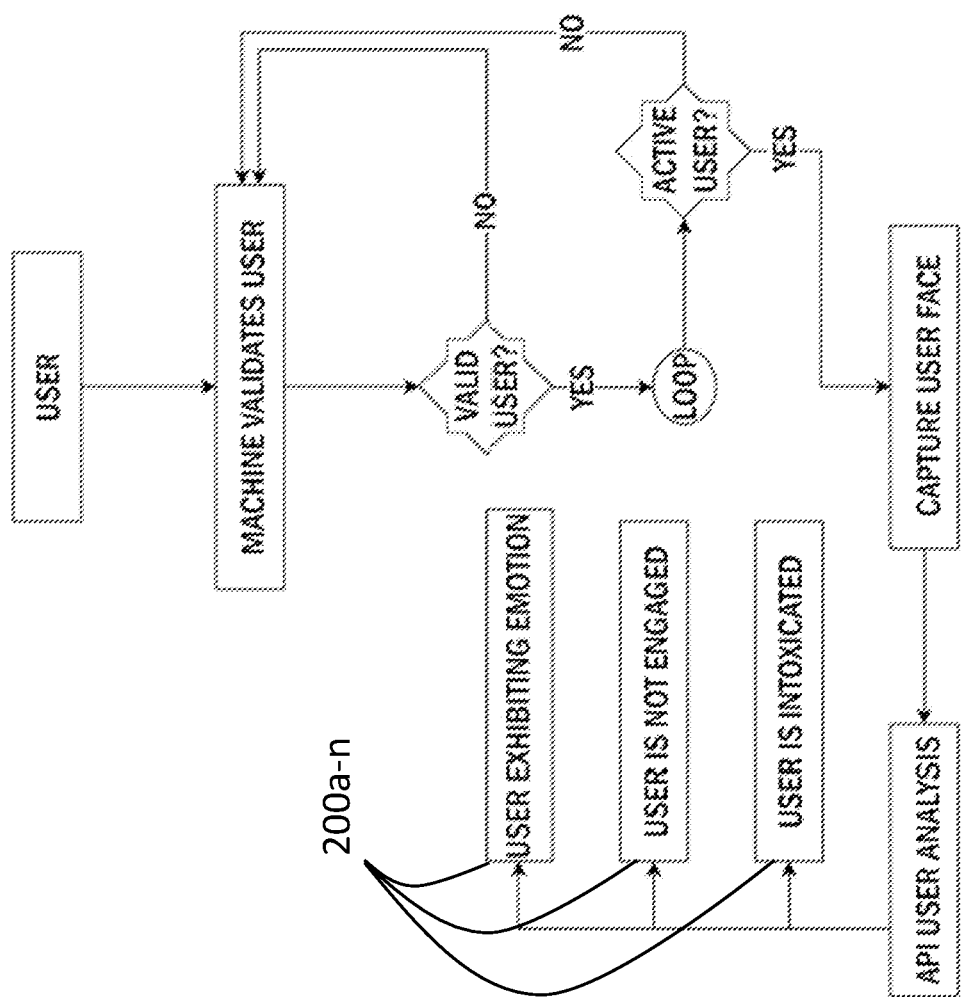
FIG. 2 is a flow chart diagram of a user tracking system and method, in accordance with the present invention.
Figure 3:
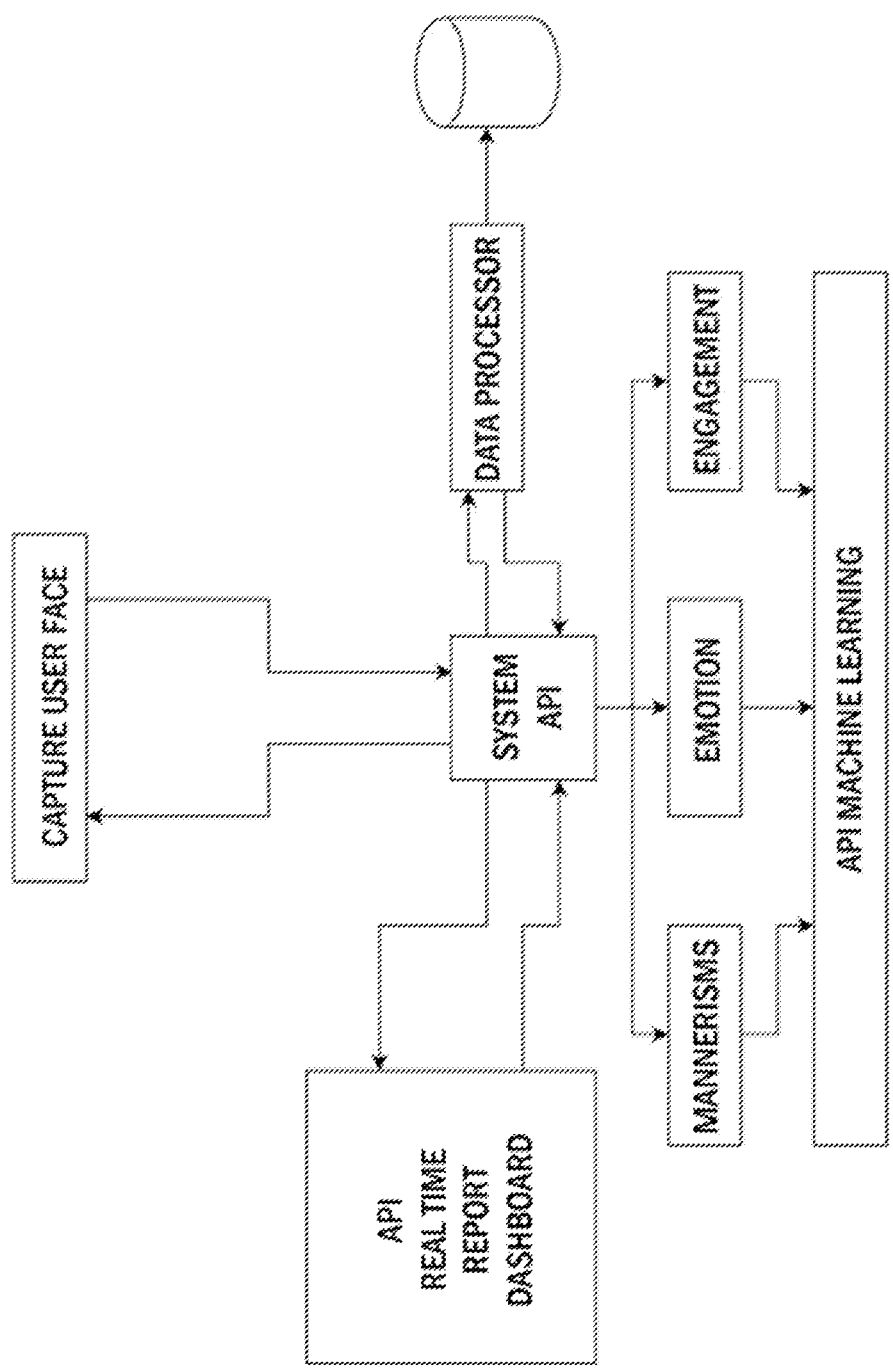
FIG. 3 is a block diagram of an exemplary embodiment of a user tracking system and method, in accordance with the present invention.

The illustrations of FIGS. 2 and 3 schematically illustrate an exemplary embodiment of a computer-implemented method of user engagement and tracking user mannerisms for gaming systems ("user tracking system and method"), as contemplated by the present disclosure. Casinos want to ensure that customers sit at a slot machine or gaming table and play for as long as possible. If they could install a sensor system that predicted when people had a higher propensity to quit, then they would be able to intercede and prevent that from happening with incentives, prizes, concierge attention, or whatever other methods they determine are effective at keeping customers engaged and betting. Thus, the value proposition for them is enormous.

Figure 5:
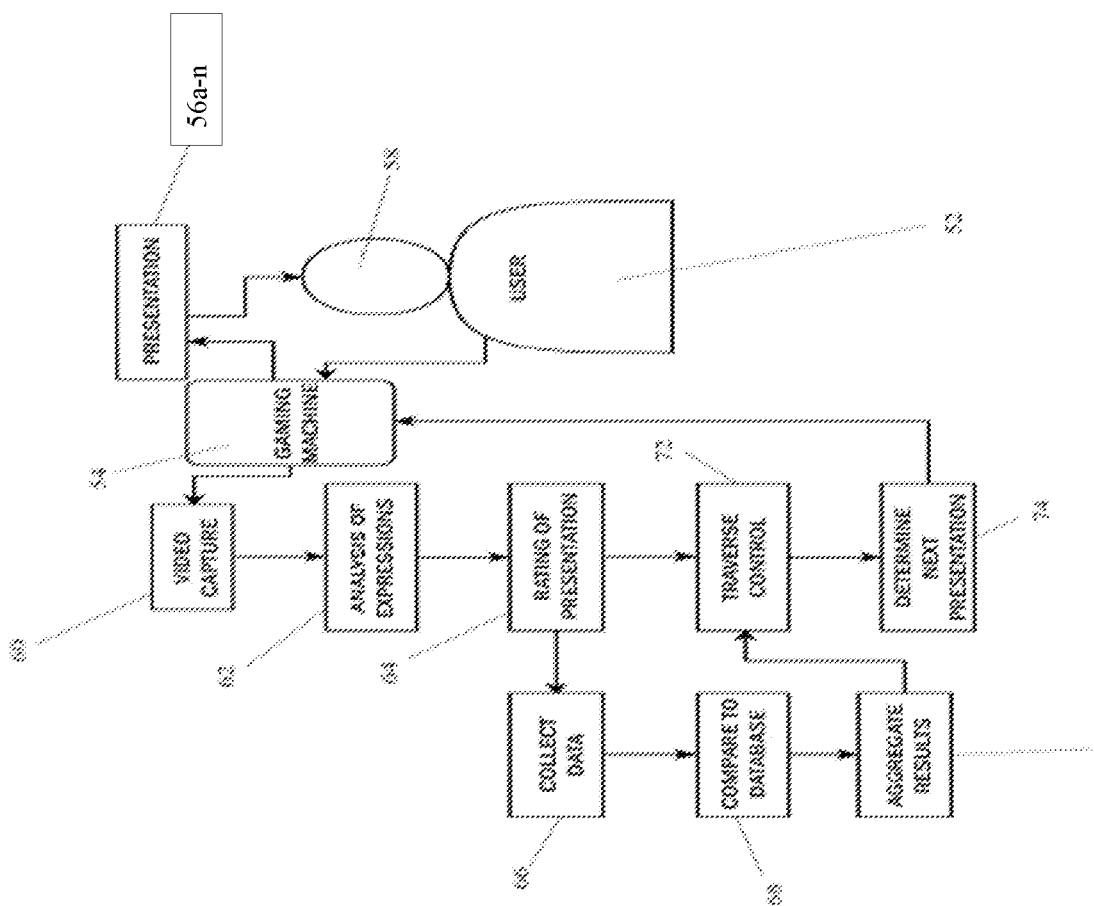
FIG. 5 is another flow chart diagram of an exemplary embodiment of a user tracking system and method, in accordance with the present invention.

As best seen in FIGS. 1, 2, and 5, an initial Step entails providing a gaming machine 54 with a display screen, eye-tracking software, facial recognition software, a camera configured to face in the same direction as the display screen faces, and a media player, the facial recognition software operably configured to recognize a plurality of facial expressions 200a-n, wherein "n" refers to any number greater than one, of the 58 user using a plurality of facial recognition parameters 100a-n on the user's 58 face.

In accordance with a second Step, there is a central database communicatively coupled with the gaming machine 54 and storing a plurality of media presentations 56a-n (as best seen in FIG. 5), wherein "n" refers to any number greater than one. The plurality of media presentations 56a-n may comprise different types of multimedia or visual depictions, such as slot machine games, mini-games, advertisements, or images.

A next Step comprises publishing one of the plurality of media presentations 56a-n through the media player on the display screen of the gaming machine 54. In a next Step, the gaming machine 54 confirms sight by the user 58 of the one of the plurality of media presentations 56a-n using eye-tracking software and using the camera. While confirming sight by the user 58, the gaming machine 54 captures, through the facial recognition software, at least one of the plurality of facial expressions 200a-n of the user 58.

In a final Step, and based solely on the at least one of the plurality of facial expressions 200a-n of the user 58 in response to the initial publication of the at least one of the plurality of media presentations 56a-n, the gaming machine 54 publishes another of the plurality of media presentations 56a-n through the media player on the display screen. Said another way, no physical or direct contact between the user 58 and the gaming machine 54 is needed for the gaming machine 54 to initiate publication of another of the plurality of media presentations 56a-n to the user 58. The type of plurality of media presentations 56a-n shown by the gaming machine 54 depends on the number, type, and quality of the at least one of the plurality of facial expressions 200a-n generated by the user 58 beforehand and on any predetermined qualifications or criteria set by a controller of the gaming machine 54.

As contemplated by the present disclosure, the user 58 checks in at a casino gaming machine 54, which has a front facing camera installed or connected for tracking purpose. The system software is accessible through the camera and machine to determine the user's 58 engagement during game play. The system also has a central database with access to a library of images both pre-stored or captured and collected over time of the specific user 58. The software will identify the individual user's 58 emotion or current state of being, and the sentiment or gesture correlated during time of engagement, and time-stamped, would be captured and provided back to the controller of the game in the form of data for reporting and evaluation for internal needs.

The user tracking system and method disclosed herein comprises, generally, a casino game machine 54 equipped with facial recognition hardware and software technologies. The user tracking system and method may further comprise affect-driven audio and visual presentation control technologies. In one embodiment, the user tracking system and method may further comprise a microphone or similar audio detection device. In such a way the user 58 of the casino game machine 54 may interact, whether actively or passively, with the casino game machine 54 to both control the machine 54 itself and to provide feedback to the machine 54. The user tracking system and method may further comprise machine learning technologies so that the system may develop and adapt to a specific user 58, or to users in the aggregate, over time.

By way of example, in one embodiment the user tracking system and method may comprise a casino game machine 54 with facial recognition technology to provide feedback on a user's 58 condition. The camera or visual input of the machine 54 may observe the user 58 of the machine and may make periodic analyses of the user's 58 plurality of facial expressions 200a-n. Readings of the user's 58 plurality of facial expression 200a-n may include, for example, happiness, sadness, anger, agitation, distractedness, boredom, intoxication, or any other appropriate measure. Such readings may be determined based on the plurality of facial recognition parameters 100a-n, and may be associated by the machine 54 with desirable or undesirable conditions.

In one embodiment of the present invention, the user system and method may capture the at least one of the plurality of facial expressions 200a-n of the user 58 and identify the at least one of a plurality of facial expressions 200a-n as comprising pupil dilation and horizontal movement, demarcating the intoxicated or non-intoxicated status of the user 58 in the central database. In other embodiments, the specific criteria associated with determining the intoxication of the user 58 may be predetermined by the controller of the gaming machine 54. In still other embodiments, the gaming machine 54 may further report or communicate the status of the intoxicated or non-intoxicated user 58 to the controller of the gaming machine 54. If the controller of the machine 54, for example, wishes to identify excessively intoxicated users, the machine 54 may take readings of a user's 58 pupil dilation and horizontal movements, and may determine that a user 58 is likely to be intoxicated. The casino game machine 54 may then report this user 58 to the controller of the machine, who may respond, as appropriate, by dispatching, for example, a concierge or security officer to attend to the user 58.

If a controller of the machine, for example, wishes to identify users who are upset or who are likely to stop playing at the machine, the machine may take readings of eyebrow, cheek, and mouth angles of the user to determine that the user is upset or annoyed. The casino game machine may then report this user 58 to the controller of the machine, who may respond, as appropriate, by offering an incentive to the user, such as a free play or other benefit that is likely to keep the user playing at the machine. Such incentives may be set up, as desired, by the controller of the machine to suit their particular needs.

In still other embodiments, the gaming machine 54 may prompt the user 58 through the display screen to elicit an intentional facial response of the user of either a smile and a frown on the user's face and, once sight by the user is confirmed, the smile and the frown on the user's face is associated with a user approval and a user disapproval, respectively, of the one of the plurality of media presentations 56a-n. The facial recognition software may then capture and communicate the intentional facial response to the central database, remote server, or locally on the gaming machine for association with one of a plurality of user records resident thereon and to generate the user baseline. In various embodiments, the baseline may either be of a specific user 58 in particular or of a group or collective of users in the aggregate.

The gaming machine 54 may also prompt the user 58 through the display screen to elicit another intentional facial response of the user of either the smile and the frown on the user's face. The specific command published by the gaming machine 54 may depend on the mathematical formula discussed herein or on particular criteria set by the controller of the machine.

In another embodiment, a further Step may comprise removing or maintaining the publication of the another of the plurality media presentations 56a-n with the user approval or the user disapproval, respectively, of the another intentional facial response of the user.

The facial recognition software may be operably configured to recognize the plurality of facial expressions 200a-n using the plurality of facial recognition parameters 100a-n on the user's face and with a user baseline.

In one embodiment the casino game machine may be programmed to automatically offer the pre-determined incentive to the user, and may be set to report to the controller of the machine if the automatically-offered incentive proved ineffective in regaining the user's attention. In this way the system provides layered feedback to the controller of the machine, and a second opportunity for attending to the needs of the machine user. Some embodiments of the present invention, the casino game machine, specifically for example, the controller or network interface, may communicate a notice to the user (through the machine display), administrator, or other person or device upon receiving and determining one or more of the plurality of facial expressions 200a-n using the plurality of facial recognition parameters 100a-n of the user.

By way of example, in one embodiment the system may comprise a casino game machine with facial recognition technology to allow a user to control the machine or game itself. The facial recognition technology may associate, for example, a smile with an affirmative response and a frown with a negative response. In one embodiment the facial recognition technology may comprise a lip-reading technology that can determine words stated based on visual input, and where a "yes" or a "no" may be understood by the system. In such a system the user may be able to command the machine to, for example, play the next round of the displayed game, by giving an affirmative response. The system may also be able to understand other common commands such as, for example, "hit," "stay," "double down," "spin," and "cash out," to issue various game-related instructions to the machine. In one embodiment, the machine may further comprise a microphone or other listening device to further augment or to add a second method of confirmation to the instruction-receiving ability of the system.

In one embodiment it is contemplated that the user of the casino game machine may be associated with an identification card, tag, or similar device, such that the system may associate facial expressions and behaviors with the user. The recorded expressions and behaviors of the user may be used, over time, to develop a behavioral pattern for the individual user, and for users in the aggregate, to allow the system or a controller of the casino game machine to determine the effectiveness of various incentives and the likely frequency for a needed intervention.

Figure 4:
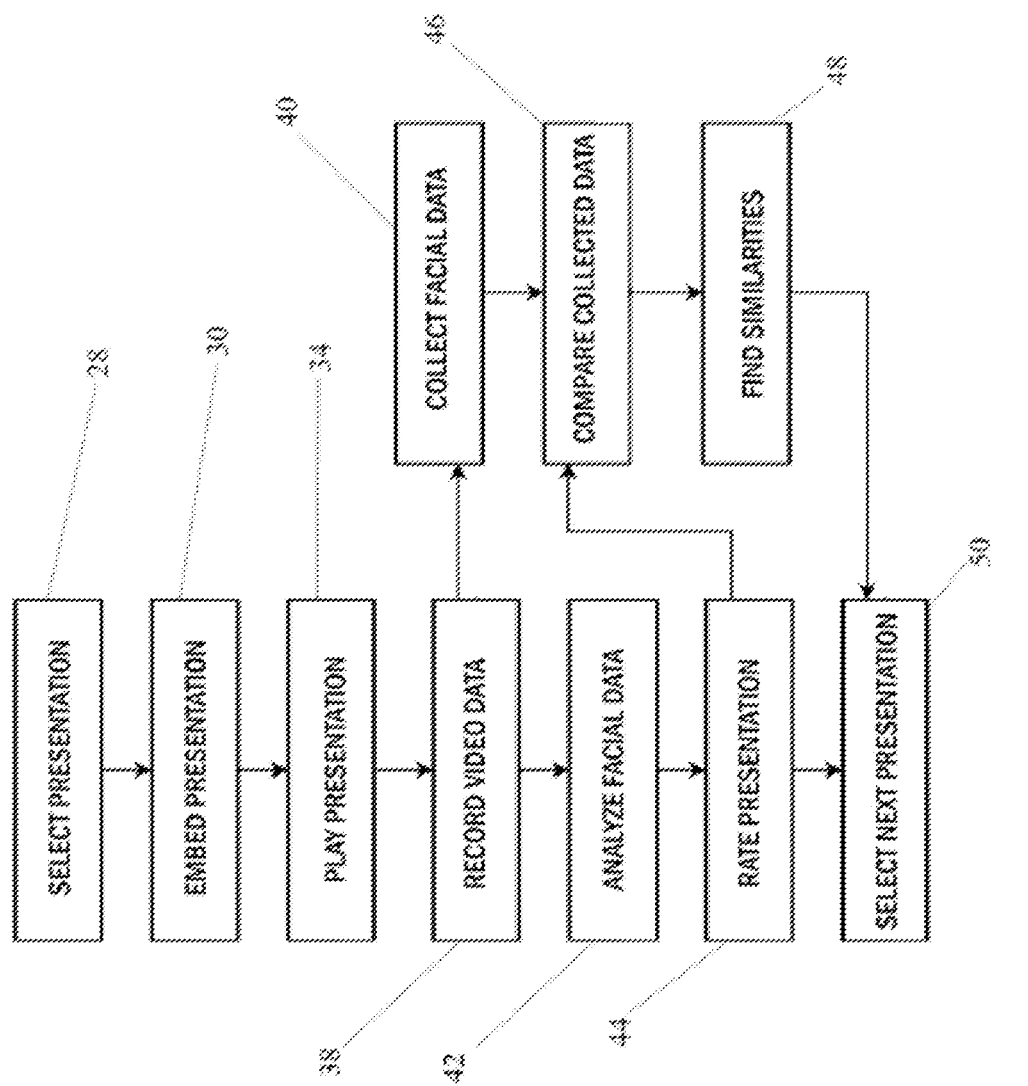
FIG. 4 is a flow chart diagram of a user tracking system and method.

The illustration of FIG. 4 is a flow diagram for displaying a media presentation, which may specifically be a casino game program. The presentation is selected to be viewed on a casino game machine initially by the casino game machine 28. Next, the presentation is embedded to the video player of the machine 30. The presentation is then played on the display screen of the device 34. Using open source eye-tracking and pupil-tracking software, the hardware and software combination may be able observe the viewer's eyes and determine, based on any appropriate or commonly-used measure, that the viewer is looking at the display screen.

Once the application has determined that the viewer is looking directly at the screen, the viewer's facial response such as a frown or smile showing approval or disapproval of the media presentation 36 may be observed. If the viewer does not elicit a measurable response, then the viewer may be prompted for one again once the viewer's eye-gaze can be detected until a facial response is measured.

Next, the viewer's facial response is recorded 38, measured, and transposed to data 40 via the casino game machine's user-facing camera. If there is not enough lighting in the room to measure a response then the brightness of the screen on the casino game machine display may be controlled by the software, and the brightness may be increased to light up the person's face. The data is then analyzed using the conditional mathematical formula, as discussed above, to determine if the person elicited a smile (approval response) or frown (disapproval response) 42. While that is occurring, the facial response data is transcribed to a shared computer database which may be located on a remote server, cloud based computer, or locally on the machine itself and is then compared and contrasted with other viewers to find similarities in facial expression responses 46.

The viewer can be categorized in the database by demographics and the application can begin logging which media presentations the viewer likes or dislikes. That data can then be compared to other similar viewers in order to look for similarities between viewers 48. Once the presentation has been rated as either desirable or undesirable 44, through the input of either a smile or a frown, respectively, a new media presentation will be chosen based on the analyzed data of the viewer 50. The media presentation may specifically comprise a new round of the casino game, a suggestion for playing a different casino game, an incentive presented to the user, or any other appropriate response.

The illustration of FIG. 5 shows a system for capturing facial responses to a media presentation. The media presentation is selected to be viewed on a casino game machine display. Next, the casino game machine's front facing camera records and captures the viewer's face 60, transposes the data, and analyzes the result as a facial expression 62. It then rates the purposeful response as either a smile (approval) or a frown (disapproval) 64. The casino game machine then transcribes the data to a shared database on a remote computer server, cloud based server 66, or locally on the machine itself for varied levels of access to the same application on other devices.

The data can be compared and contrasted to other stored data for similar viewers 68, and the results can be collected and compiled 70. This allows the casino game machine to traverse control as a means of hands-free input 72 and determine whether to change the media presentation on its own 74. If the viewer expresses approval then the media presentation may not be changed, but if the viewer expresses disapproval then the media presentation may be accordingly changed and may be changed to a more desirable presentation based on the collected aggregate data available in the database.

This is a method for prompting facial response from recorded video user input via a casino game machine's user-facing camera. Using open source eye-tracking and pupil tracking software, once the application has determined that the viewer is looking directly at the screen during the presentation playback, the viewer will be prompted to either smile for approval or frown for disapproval. If the viewer does not elicit a measurable response, then the viewer will be prompted for one again once the application is able to reacquire eye-gaze. If there is not enough lighting in the room to measure a response, then the brightness of the screen on the mobile device can be increased to light up the person's face. In one embodiment, the prompt could be a small gray-scale icon appearing in a corner of the screen that is superimposed on top of the presentation that is playing, similar to a watermark or popup window.

Figure 6:
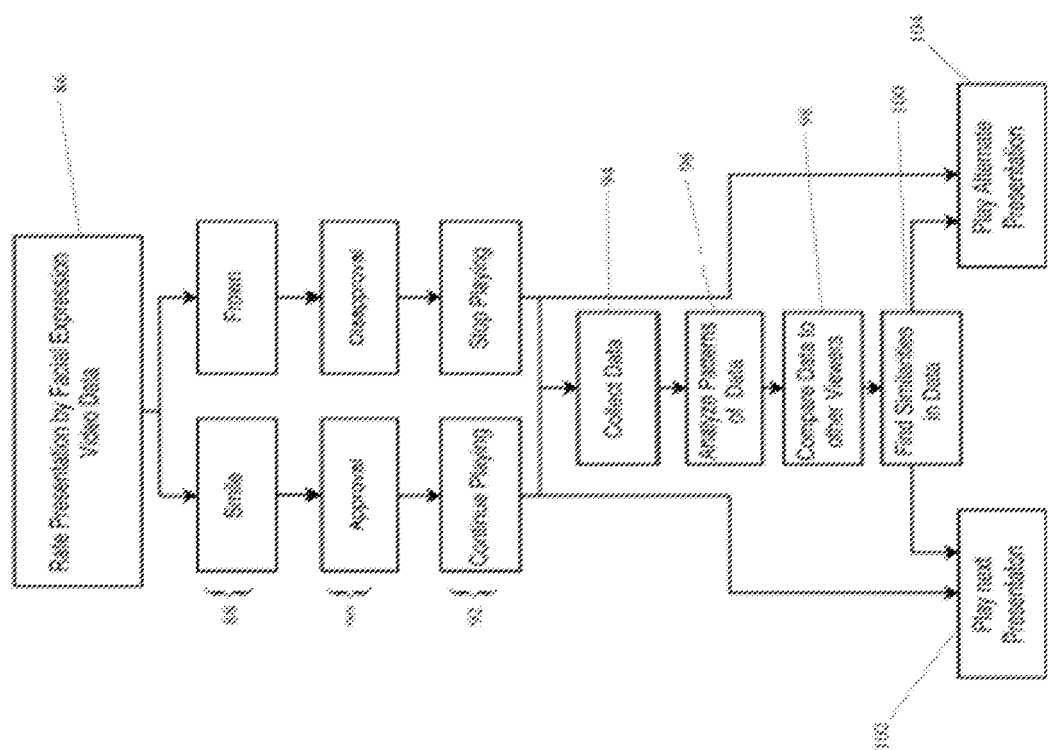
FIG. 6 is a flow chart diagram of a user tracking system and method.

The illustration of FIG. 6 shows a graphical representation of categorizing a facial response as user input. Once the media presentation has been played there is a simple conditional formula for determining whether the presentation should continue to play or whether a more suitable presentation should be played instead, as discussed above. As such, the presentation will be rated by intentional facial response video data. The viewer will be given the option of either smiling or frowning 86. A smile will be quantified with approval, and a frown with disapproval 88. As such, the video will continue playing for an approval response while it will stop playing and be changed for a disapproval 90. For approval, the next video can be played sequentially without further processing 102. Or, however, for either approval or disapproval, data can be collected and contrasted with a database of other viewers stored on either a remote computer server or cloud-based server 98.

Those patterns of data such as viewer demographics and presentations being watched can be compared and contrasted in order to fine tune commercial programming 100. The data can be compared with other viewers 98 to find similarities and make recommendations based on similarities between the viewers, such as demographics and facial responses to the videos 100. The next presentation can then be customized to the viewer based on the findings 104 and the viewer can be prompted for an intentional facial response to view a recommendation or not 86.

The advantages of the present invention include, without limitation, no bodily movement or speech required of the viewer, whether it be a hand movement, gesture, voice, or determining a person's psychological affect or state of mind while playing targeted media presentations. The invention is also an alternate means for persons with physical and psychological disabilities to express either satisfaction or dissatisfaction with commercial programming.

The design of the current system allows a viewer to use facial responses in crowded public areas where video presentations are displayed. Unlike emotional affect or mental state systems that are designed for lengthy videos and which may be inaccurate in not taking into account confounding variables such as external environmental stimuli (such as a dog barking or someone speaking in the background), which are actually causing the viewer's facial responses, this system intentionally prompts the viewer to either frown, showing disapproval and thereby stop the media presentation, or smile, to continue viewing the presentation.

Figure 7:
FIG. 7 is another block diagram of the Steps of a user tracking system and method, in accordance with the present invention.

The illustration of FIG. 7 schematically presents a computing system that may represent an embodiment of the present invention. In some embodiments the method is executed on a computing system such as computing system 200. For example, storage machine 204 may hold instructions executable by logic machine 202 to provide the method to users.

Display subsystem 206 may display the various elements of the method to participants. For example, display subsystem 206, storage machine 204, and logic machine 202 may be integrated such that the method may be executed while being displayed on a display screen. The input subsystem 208 may receive user input from participants to indicate the various choices or user inputs described above.

The described method may be executed, provided, or implemented to a user on one or more computing devices via a computer-program product such as via an application programming interface (API). Computing system 200 may be any appropriate computing device such as a personal computer, tablet computing device, gaming device or console, mobile computing device, etc. Computing system 200 includes a logic machine 202 and a storage machine 204. Computing system 200 may include a display subsystem 206, input subsystem 208, and communication subsystem 210.

Logic machine 202 may execute machine-readable instructions via one or more physical devices. For example, the logic machine 202 may be configured to execute instructions to perform tasks for a computer program. The logic machine may include one or more processors to execute machine-readable instructions.

Storage machine 204 includes one or more physical devices configured to hold or store instructions executable by the logic machine to implement the method. When such methods and processes are implemented, the state of storage machine 204 may be changed to hold different data. For example, storage machine 204 may include memory devices such as various hard disk drives or CD or DVD devices.

Display subsystem 206 may visually present data stored on storage machine 204. For example, display subsystem 206 may visually present data to form a graphical user interface (GUI). Input subsystem 208 may be configured to connect and receive input from devices such as a mouse, keyboard, or gaming controller. Communication subsystem 210 may be configured to enable system 200 to communicate with other computing devices. Communication subsystem 210 may include wired and/or wireless communication devices to facilitate networked communication.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents. While the embodiments described above refer to particular features, the scope of this disclosure also includes embodiments having different combinations of features and embodiments that do not include all of the above described features.

What is claimed is:

1. A computer-implemented method of user engagement and tracking user mannerisms for gaming systems, the method comprising:

providing a gaming machine with a display screen, eye-tracking software, facial recognition software, a camera configured to face in the same direction as the display screen faces, and a media player, the facial recognition software operably configured to recognize a plurality of facial expressions of a user using a plurality of facial recognition parameters on the user's face;

providing a central database communicatively coupled with the gaming machine and storing a plurality of media presentations;

publishing one of the plurality of media presentations through the media player on the display screen of the gaming machine;

confirming sight by the user of the one of the plurality of media presentations using eye-tracking software and using the camera;

while confirming sight by the user, capturing, through the facial recognition software, at least one of the plurality of facial expressions of the user; and publishing another of the plurality of media presentations through the media player on the display screen and, after initial publication of the one of the plurality of media presentations, solely based on the at least one of the plurality of facial expressions of the user.

2. The method according to claim 1, further comprising:

prompting the user through the display screen to elicit an intentional facial response of the user of either a smile and a frown on the user's face and, once sight by the user is confirmed, the smile and the frown on the user's face associated with a user approval and a user disapproval, respectively, of the one of the plurality of media presentations.

3. The method according to claim 2, further comprising:

capturing, through the facial recognition software, the intentional facial response and communicating the intentional facial response to the central database for association with one of a plurality of user records resident thereon and to generate the user baseline.

4. The method according to claim 3, further comprising:
publishing another of the plurality of media presentations through the media player on the display screen and, after initial publication of the one of the plurality of media presentations and during publication of the another of the plurality of media presentations through the media player on the display screen, prompting the user through the display screen to elicit another intentional facial response of the user of either the smile and the frown on the user's face.

5. The method according to claim 4, further comprising:
capturing, through the facial recognition software, the another intentional facial response of the user and communicating the another intentional facial response to the central database for ascertaining the user approval or the user disapproval using the user baseline.

6. The method according to claim 5, further comprising:
removing or maintaining the publication of the another of the plurality media presentations with the user approval or the user disapproval, respectively, of the another intentional facial response of the user.

7. The method according to claim 1, wherein:
the facial recognition software operably configured to recognize the plurality of facial expressions using the plurality of facial recognition parameters on the user's face and with a user baseline.

8. The method according to claim 7, further comprising:
if the sight by the user is not confirmed after one of the plurality of media presentations is published, do not prompt the user through the display screen to elicit an intentional facial response of the user of either the smile and the frown on the user's face.

9. The method according to claim 8, further comprising:
after confirming sight by the user of the one of the plurality of media presentations using eye-tracking software, measuring ambient lighting around the camera of the gaming machine and, if unable to capture the intentional facial response through the facial recognition software because of insufficient ambient lighting around the camera of the gaming machine, increasing the brightness of the display screen on the mobile electronic device.

10. The method according to claim 1, further comprising:
periodically confirming sight by the user using the eye-tracking software to recognize a smile and a frown on a user's face with a user baseline.

11. The method according to claim 1, further comprising:
after capturing the at least one of the plurality of facial expressions of the user, identifying the at least one of the plurality of facial expressions as comprising pupil dilation or horizontal movement and demarcating the intoxicated or non-intoxicated status of the user in the central database.

12. The method according to claim 11, further comprising:
reporting the status of the intoxicated or non-intoxicated user to a predetermined controller of the machine.

* * * * *